United States Patent
Zelinski et al.

(10) Patent No.: US 6,325,415 B1
(45) Date of Patent: Dec. 4, 2001

(54) AIR BAG MODULE WITH TETHERED DOOR

(75) Inventors: Lawrence J. Zelinski, Chesterfield; Laurence H. Keeler, Marysville, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/584,298

(22) Filed: May 31, 2000

(51) Int. Cl.$^7$ ................................................. B60R 21/16
(52) U.S. Cl. ................................. 280/743.2; 280/728.1; 280/728.2; 280/732; 280/728.3
(58) Field of Search .............................. 280/728.1, 728.2, 280/728.3, 730.2, 732, 743.1, 743.2

(56) References Cited

U.S. PATENT DOCUMENTS

| | | | |
|---|---|---|---|
| 5,242,191 | 9/1993 | Faigle et al. ........................ | 280/728 |
| 5,340,149 | 8/1994 | Gajewski ............................. | 280/732 |
| 5,364,123 | * 11/1994 | Abramczyk et al. ............. | 280/728.1 |
| 5,398,958 | 3/1995 | Taggart ............................. | 280/728 A |
| 5,431,433 | 7/1995 | Steimke et al. .................... | 280/728.3 |
| 5,533,746 | * 7/1996 | Whited .............................. | 280/728.2 |
| 5,613,701 | * 3/1997 | Bentley et al. .................... | 280/728.3 |
| 5,647,607 | * 7/1997 | Boileau ............................. | 280/728.2 |
| 5,651,562 | * 7/1997 | Hagen et al. ...................... | 280/728.3 |
| 5,887,891 | * 3/1999 | Taquchi et al. .................... | 280/728.2 |
| 5,899,488 | * 5/1999 | Muller .............................. | 280/728.3 |
| 5,904,367 | * 5/1999 | Warnez et al. .................... | 280/728.3 |
| 5,941,557 | * 8/1999 | Mullins, Jr. et al. ............... | 280/728.3 |
| 5,941,558 | * 8/1999 | Labrie et al. ...................... | 280/728.3 |
| 5,971,431 | * 10/1999 | Wohllebe et al. .................. | 280/732 |
| 6,045,154 | * 4/2000 | Walton et al. ..................... | 280/728.3 |
| 6,053,527 | * 4/2000 | Gans et al. ........................ | 280/728.3 |
| 6,070,901 | * 6/2000 | Hazell et al. ...................... | 280/728.3 |
| 6,076,851 | * 6/2000 | Davis, Jr. et al. ................. | 280/728.2 |
| 6,109,645 | * 8/2000 | Totani et al. ...................... | 280/728.3 |
| 6,131,943 | * 10/2000 | Breitweg .......................... | 280/728.3 |
| 6,131,945 | * 10/2000 | Labrie et al. ...................... | 280/728.3 |

* cited by examiner

Primary Examiner—J. J. Swann
Assistant Examiner—L. Lum
(74) Attorney, Agent, or Firm—Tarolli, Sundheim, Covell, Tummino & Szabo L.L.P.

(57) ABSTRACT

A vehicle occupant protection apparatus (10) for mounting on a portion (12, 20) of a vehicle (14) includes an inflatable vehicle occupant protection device (32). The apparatus (10) includes an actuatable inflator (52) for inflating the protection device (32), and a support (54, 124) for supporting the inflator and the protection device (32) on the vehicle portion. The apparatus (10) also includes a deployment door (70) having a first condition covering the protection device (32) when the protection device is in the deflated condition. The door (70) is movable from the first condition to a second condition in response to inflation of the protection device (32). A flexible tether (90) is secured to the vehicle portion (12, 20) and to the protection device (32) and to the deployment door (70). The flexible tether (90) remains secured to the vehicle portion (12, 20) to limit movement of the deployment door (70) away from the vehicle portion in response to inflation of the protection device (32).

16 Claims, 3 Drawing Sheets

AIR BAG MODULE WITH TETHERED DOOR

BACKGROUND OF THE INVENTION

1. Technical Field

The present invention relates to an apparatus for helping to protect an occupant of a vehicle. In particular, the invention relates to an apparatus including an inflatable protection device and a deployment door that is tethered to limit movement of the door upon inflation of the protection device.

2. Description of the Prior Art

A typical passenger side air bag module for a vehicle includes an inflatable protection device in the form of an air bag, and an actuatable inflator assembly for inflating the air bag. The inflator assembly is mounted on the instrument panel of the vehicle, together with the deflated air bag, behind a deployment door. Upon actuation of the inflator, the inflating air bag opens the deployment door and inflates into the vehicle occupant compartment to help protect a passenger of the vehicle.

The deployment door fits into and closes a deployment opening in the trim pad or cover of the instrument panel. The inflator assembly and the air bag are rigidly secured to a supporting portion of the instrument panel behind the deployment door. In some modules, the deployment door is connected with, but movable relative to, the inflator assembly, during installation in the vehicle, to ensure the best possible fit of the deployment door in the deployment opening. U.S. Pat. No. 5,431,433 describes an air bag module in which the deployment door is movable relative to the inflator assembly and is also tethered to the inflator assembly to prevent it from separating completely from the instrument panel upon actuation of the inflator.

SUMMARY OF THE INVENTION

The present invention is a vehicle occupant protection apparatus. The apparatus includes a portion of a vehicle. The apparatus also includes an inflatable vehicle occupant protection device having a deflated, stored condition and an inflated condition. The apparatus includes an actuatable inflator for inflating the protection device, and a support for supporting the inflator on the vehicle portion. The apparatus also includes a deployment door having a first condition covering the protection device when the protection device is in the deflated condition and being movable from the first condition to a second condition in response to inflation of the protection device. A support supports the protection device on the vehicle portion. A flexible tether is secured to the vehicle portion and to the protection device and the deployment door, and remains secured to the vehicle portion, for limiting movement of the deployment door away from the vehicle portion in response to inflation of the protection device.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF AN EMBODIMENT OF THE INVENTION

Figure 1:
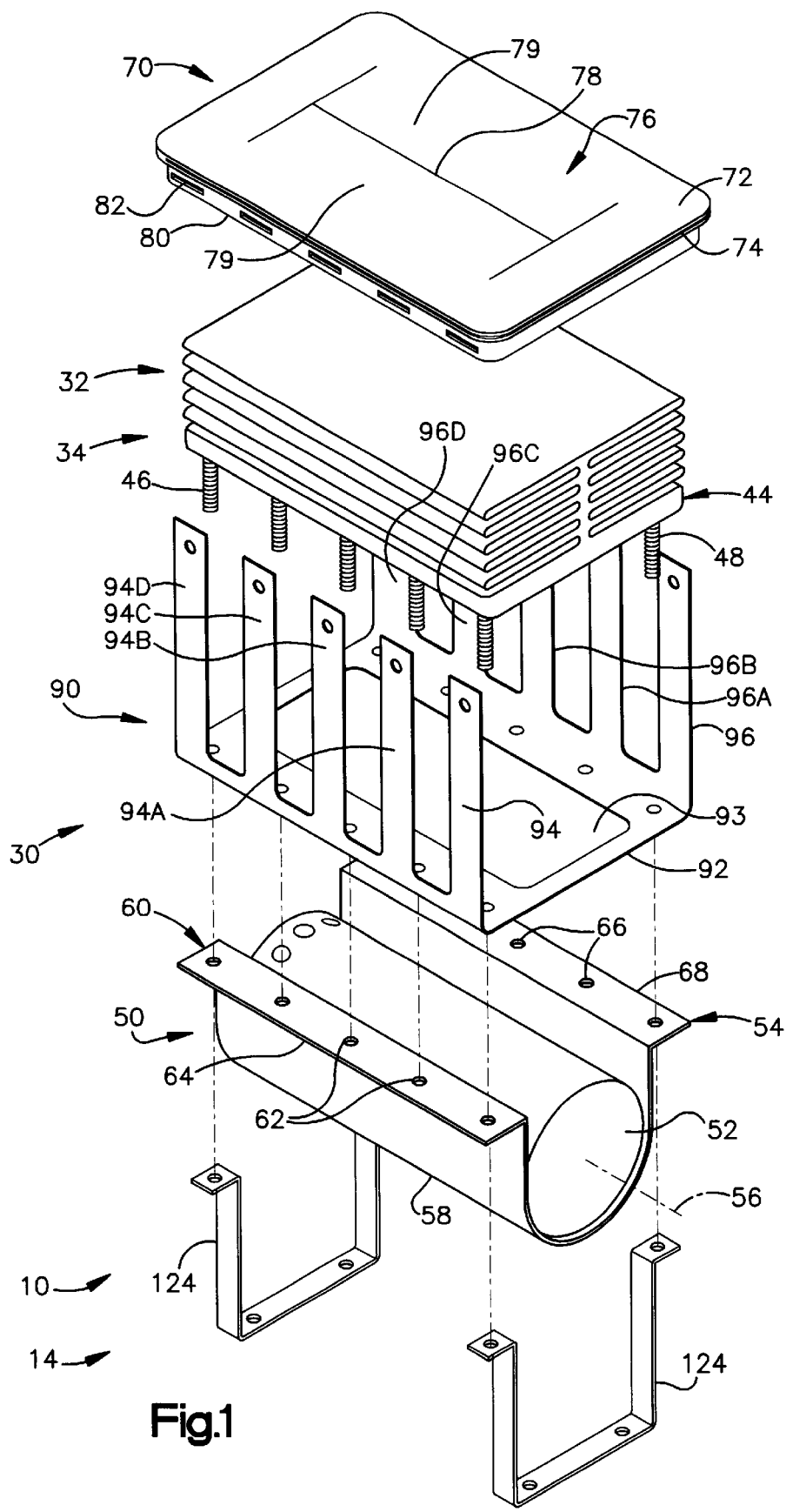
FIG. 1 is an exploded perspective view of an occupant protection apparatus constructed in accordance with the present invention.

The present invention relates to an apparatus for helping to protect an occupant of a vehicle. In particular, the invention relates to an apparatus including an inflatable protection device and a deployment door that is tethered to limit movement of the door upon inflation of the protection device. As representative of the present invention, FIG. 1 illustrates an occupant protection apparatus 10 constructed in accordance with the invention. The occupant protection apparatus 10 is mounted in a portion 12 of a vehicle 14.

The vehicle portion 12 is an instrument panel of the vehicle 14. The instrument panel 12 includes a support portion, illustrated schematically at 16, which forms a rigid mount for the occupant protection apparatus 10.

The instrument panel 12 also includes a trim pad, a portion of which is illustrated at 20. The trim pad 20 extends over and covers the support portion 16 of the instrument panel 12. An edge portion 24 of the trim pad 20 defines a deployment opening 22 in the trim pad 20.

The occupant protection apparatus 10 includes an air bag module 30. The air bag module 30 includes a particular type of inflatable device, illustrated schematically at 32, which is commonly known as an air bag. The air bag 32 is preferably made from a flexible fabric material, such as woven nylon. The air bag 32 can alternatively be made from a flexible non-woven material, such as plastic film. The use of plastic film, in particular, would require one or more inflation fluid vents to be formed in the air bag 32, as is known in the art.

Figure 3:
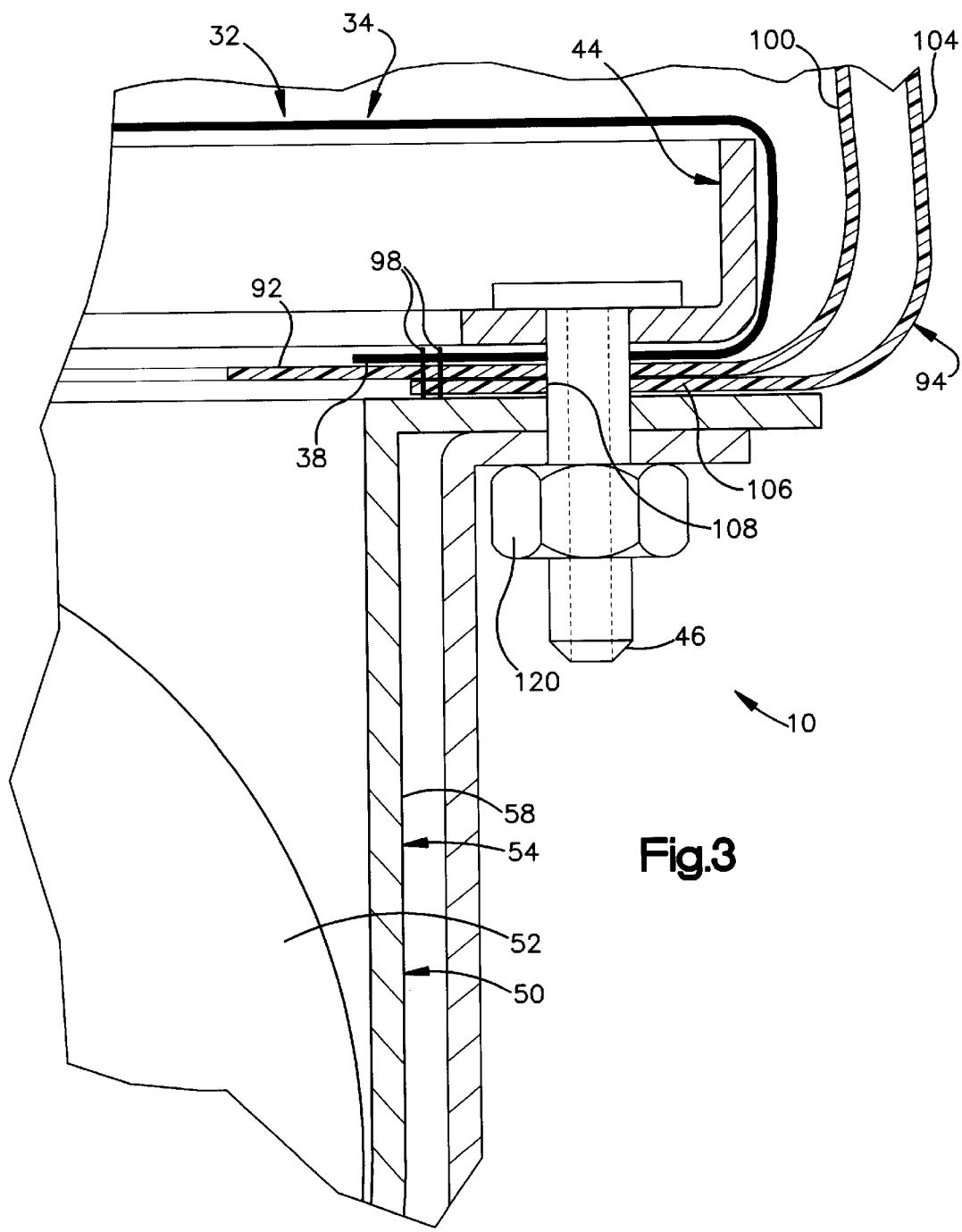
FIG. 3 is an enlargement of a portion of FIG. 2.

The air bag 32 is folded into a compact shape as part of a box-shaped bag pack 34. The bag pack has a bottom (as viewed in the drawings) surface 38 (FIG. 3), and axially extending, outer side surfaces 40 and 42. The bag pack 34 also includes a retaining ring or retainer 44 with which the air bag 32 is connected. An axially extending row of first mounting studs 46 on the retainer 44 extends from the bottom surface 38 of the bag pack 34. An axially extending row of second mounting studs 48 on the retainer 44 also extends from the bottom surface 38 of the bag pack 34.

The air bag module 30 also includes an inflator assembly indicated schematically at 50. The inflator assembly 50 includes an inflator 52 supported in a housing or reaction canister 54. The inflator 52 has an elongate cylindrical configuration centered on an axis 56. The inflator 52 preferably contains a stored quantity of pressurized inflation fluid and an ignitable material for heating the inflation fluid. The module 30 alternatively could include an inflator 52 that uses the combustion of gas-generating material to generate inflation fluid in the form of gas to inflate the air bag 32, or an inflator that contains only a stored quantity of pressurized inflation fluid for inflating the air bag.

The housing 54 has an axially extending, U-shaped central portion 58 for receiving and supporting the inflator 52 in a known manner. The housing 54 also has an outer peripheral bag mounting flange 60 presented toward the bag pack 44. An axially extending row of first fastener openings 62 is formed in a first side portion 64 of the flange 60. An axially extending row of second fastener openings 66 is formed in a second side portion 68 of the flange 60.

The occupant protection apparatus includes a cover or deployment door 70, which closes the deployment opening 22. The deployment door 70 is preferably made from the same material as the trim pad. The door 70 has an outer peripheral portion, or fixed portion, 72, having a groove or other surface feature 74 for attaching the door to the trim pad 20. A central portion, or movable a portion, 76, of the door 70 is located within the fixed outer portion 72 and overlies the deployment opening 22. The central portion 76 of the door 70 as illustrated includes an H-shaped tear seam 78, which defines two relatively movable sections 79 of the door.

The fixed portion 72 of the door 70 includes a first tethering flange 80, which projects toward the inflator assembly 50 adjacent one side of the deployment opening 22. The first tethering flange 80 has a row of first slots 82. The fixed portion 72 of the door 70 also includes a second tethering flange 84, which extends parallel to the first tethering flange 80 and projects toward the inflator assembly 50 adjacent the other side of the deployment opening 22. The second tethering flange 84 has a row of second slots 86.

The air bag module 30 includes a flexible tether 90 for limiting movement of the deployment door 70 away from the instrument panel 12 in response to inflation of the air bag 32. The tether 90 is preferably formed from a single piece of material. The tether 90 could be made from the same type of fabric material used to make the air bag 32.

The tether 90 has a U-shaped configuration including a base portion 92, a plurality of first tabs 94, 94A, 94B, 94C and 94D, and a plurality of second tabs 96, 96A, 96B, 96C and 96D. The base portion 92 of the tether 90 has a generally rectangular configuration and overlies the bottom surface 38 of the bag pack 34. The base portion 92 has an inflation fluid opening 93.

The base portion 92 of the tether 90 is secured to the bottom surface 38 of the bag pack 34 before the air bag is folded. The base portion 92 of the tether 90 is, preferably, sewn as indicated schematically at 98 (FIG. 3) to the air bag 32. The base portion 92 of the tether 90 extends partially up the two side surfaces 40 and 42 of the bag pack 34.

Figure 2:
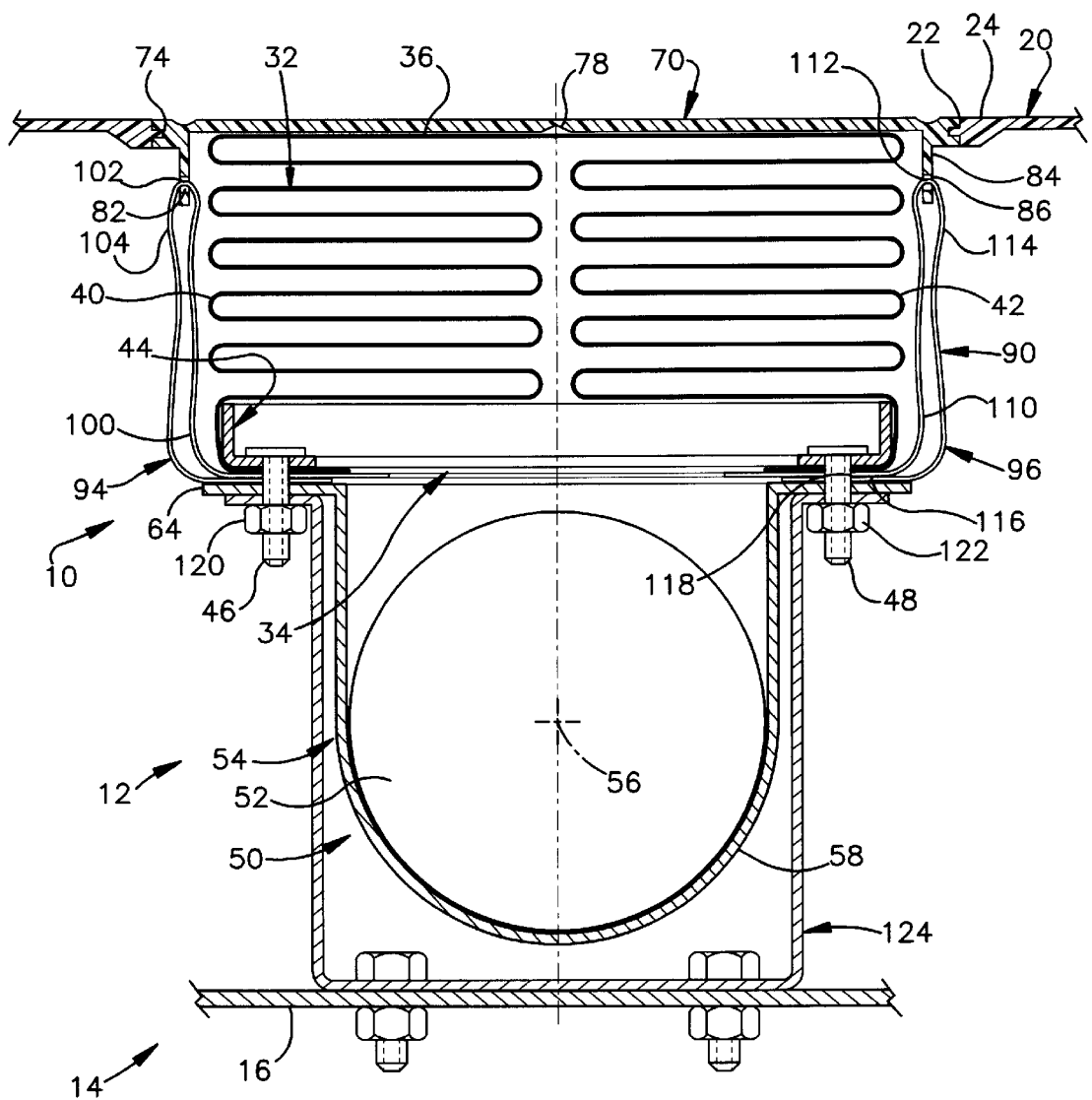
FIG. 2 is a sectional view of the occupant protection apparatus of FIG. 1.

The first tabs 94–94D extend from one side (the left side as viewed in FIG. 2) of the base portion 92. The first tabs 94–94D are identical to each other. Therefore, only the first tab 94 will be described, as exemplary.

A first portion 100 of the first tab 94 extends along the side surface 40 of the bag pack 34. A second portion 102 of the first tab 94 extends through one of the first slots 82 in the first tethering flange 80 of the door 70. A third portion 104 of the first tab 94 extends from the slot 82, in a direction parallel to and spaced outwardly from the first portion 100. A fourth portion or end portion 106 of the first tab 94 extends underneath the bottom surface 38 of the bag pack 34 and is secured to the bag pack as described below. A fastener opening 108 is located in the end portion 106.

The second tabs 96–96D extend from the opposite side of the base portion 92 as the first tabs 94–94D. The second tabs 96–96D are identical to each other and to the first tabs 94–94D. Therefore, only the second tab 96 will be described, as exemplary.

The second tab 96 has a first portion 110, which extends along the side surface 42 of the bag pack 34. A second portion 112 of the second tab 96 extends through one of the second slots 86 in the second tethering flange 84 of the door 70. A third portion 114 of the second tab 96 extends from the slot 86, in a direction parallel to and spaced outwardly from the first portion 110. A fourth portion or end portion 116 of the second tab 96 extends underneath the bottom surface 38 of the bag pack 34 and is secured to the bag pack as described below. A fastener opening 118 is located in the end portion 116.

During assembly of the apparatus 10, the folded air bag 32 and retainer 44, with the tether 90 already attached by sewing to the air bag as described above, are placed adjacent the door 70 as shown in FIG. 1. A first tab 94 is looped through the slot 82 in the first tethering flange 80 of the door 70. The end portion 106 of the first tab 94 is fitted over one of the first mounting studs 46 of the retainer 44 so that the first mounting stud extends through the fastener opening 108 in the end portion 106 of the first tab. In a similar manner, the remaining first tabs 94A–94D are connected. second tab 96 is looped through the slot 86 in the second tethering flange 84 of the door. The end portion 116 of the second tab 96 is fitted over one of the second mounting studs 48 of the retainer 44 so that the second mounting stud extends through the fastener opening 118 in the end portion of the second tab. In a similar manner, the remaining second tabs 96A–96D are connected.

The assembled bag pack 34, tether 90 and door 70 are then fastened to the inflator assembly 50. The first mounting studs 46 of the retainer 44 extend through the first fastener openings 62 in the housing 54, and are secured with nuts 120. The second mounting studs extend 48 of the retainer 44 through the second fastener openings 66 in the housing 54, and are secured with nuts 122. A pair of attachment brackets 124 attach the housing 54 to the support portion 16 of the instrument panel 12. The housing 54 and brackets 124 thus support the inflator 52 on the instrument panel 12. The housing 54 and brackets 124, together with the retaining ring 44, also support the air bag 32 on the instrument panel 12. It should be understood that the housing 54 could be attached to the instrument panel 12 in a different manner.

The door 70 is fitted into the deployment opening 22 in the trim pad 20 of the instrument panel 12. The groove 74 on the fixed portion 72 of the door 70 snaps into engagement with the edge portion 24 of the trim pad 20 to releasably secure the door to the trim pad. The length of the first tabs 94–94D and of the second tabs 96–96D is selected to leave a small amount of slack in all the tabs when the module 30 is fully assembled in the instrument panel 12. This slack enables the door 70 to be moved relative to the inflator assembly 50 in order to be fitted properly within the deployment opening 22, even though the inflator assembly is rigidly fixed to the support portion 16 of the instrument panel 12.

Upon actuation of the inflator 52, the air bag 32 is inflated through the deployment opening 22 and ruptures the door 70 at the tear seam 78. The inflating air bag 32 exerts a substantial amount of force on the fixed portion 72 of the door 70. In the event the snap fit of the door 70 in the trim pad 20 does not keep the door attached to the trim pad, the tether 90 limits movement of the door away from the trim pad portion 20 of the instrument panel 12 in response to inflation of the air bag 32.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant protection apparatus comprising:
 a vehicle portion;
 an inflatable vehicle occupant protection device having a deflated, stored condition and an inflated condition;
 an actuatable inflator for inflating said protection device;
 a deployment door having a first condition covering said protection device when said protection device is in the deflated condition and being movable from the first condition to a second condition in response to inflation of said protection device;

a support for supporting said inflator and said protection device on said vehicle portion;

a retaining ring connected with said protection device, said retaining ring having a plurality of mounting studs for connecting said retaining ring with said support; and a flexible tether secured to said vehicle portion and to said protection device and said deployment door and remaining secured to said vehicle portion for limiting movement of said deployment door away from said vehicle portion in response to inflation of said protection device.

2. An apparatus as set forth in claim 1 wherein said tether is sewn to said protection device.

3. An apparatus as set forth in claim 1 wherein said tether has a generally U-shaped configuration.

4. An apparatus as set forth in claim 1 wherein said deployment door has at least one slot and said tether extends through said one slot.

5. An apparatus as set forth in claim 1 wherein said deployment door has a plurality of slots and said tether includes a plurality of tabs which extend through said plurality of slots.

6. An apparatus as set forth in claim 1 wherein said tether is sewn to said protection device and has a portion that extends through at least one slot in said door.

7. An apparatus as set forth in claim 1 wherein said tether has fastener openings through which said mounting studs extend.

8. An apparatus as set forth in claim 7 wherein said fastener openings in said tether are formed in end portions of said tether, said tether having a base portion sewn to said protection device to secure said tether to said protection device.

9. An apparatus as set forth in claim 8 wherein said tether has portions extending through openings in said deployment door to secure said door to said protection device.

10. A vehicle occupant protection apparatus comprising:

a vehicle portion;

an inflatable vehicle occupant protection device having a deflated, stored condition and an inflated condition;

an actuatable inflator for inflating said protection device;

a deployment door having a first condition covering said protection device when said protection device is in the deflated condition and being movable from the first condition to a second condition in response to inflation of said protection device;

a support for supporting said inflator and said protection device on said vehicle portion; and a flexible tether secured to said vehicle portion and to said protection device and said deployment door and remaining secured to said vehicle portion for limiting movement of said deployment door away from said vehicle portion in response to inflation of said protection device, said tether including a base portion and a plurality of tabs that extend from opposite sides of said base portion, said deployment door including a plurality of slots on opposite sides of a deployment opening, said plurality of tabs of said tether extending through said plurality of slots to secure said deployment door to said protection device.

11. A vehicle occupant protection apparatus comprising:

a vehicle portion;

an inflatable vehicle occupant protection device having a deflated, stored condition and an inflated condition;

an actuatable inflator for inflating said protection device to said inflated condition;

a deployment door having a first condition covering said protection device when said protection device is in the deflated condition and being movable from the first condition to a second condition in response to inflation of said protection device, said deployment door further having a deployment opening through which said protection device inflates;

a support for supporting said inflator and said protection device on said vehicle portion; and a flexible tether attached to said vehicle portion, to said protection device, and to said deployment door, said flexible tether remaining attached to said vehicle portion subsequent to said protection device attaining said inflated condition, said flexible tether limiting movement of said deployment door away from said vehicle portion in response to inflation of said protection device, said flexible tether including a first portion and a second portion separate from said first portion, both portions being attached to said protection device at a single location adjacent said vehicle portion.

12. An apparatus as set forth in claim 11 wherein said deployment opening is defined by said protection device rupturing a tear seam of said deployment door.

13. A vehicle occupant protection apparatus comprising:

a vehicle portion;

an inflatable vehicle occupant protection device having a deflated, stored condition and a fully inflated condition;

an actuatable inflator for inflating said protection device;

a deployment door having a first condition, a second condition, and a third condition a support for supporting said inflator and said protection device on said vehicle portion; and a flexible tether attached to said vehicle portion and to said deployment door, said first condition being defined by said protection device being in said deflated condition, said deployment door being attached to said vehicle portion, and said flexible tether being slack, said second condition being defined by said protection device being in said fully inflated condition, said deployment door being attached to said vehicle portion, and said flexible tether being slack, said third condition being defined by said protection device being in said fully inflated condition, said deployment door being detached from said vehicle portion, and said flexible tether being tensioned.

14. An apparatus as set forth in claim 13 wherein said deployment door includes a tear seam that defines a deployment opening when said protection device ruptures said tear seam.

15. An apparatus as set forth in claim 14 wherein said protection device ruptures said tear seam when said deployment door is in said second condition.

16. An apparatus as set forth in claim 15 wherein said protection device ruptures said tear seam when said deployment door is in said third condition.

* * * * *